United States Patent [19]

Wilber et al.

[11] 4,220,008
[45] Sep. 2, 1980

[54] EXHAUST BRAKE MODULATING CONTROL SYSTEM

[75] Inventors: Dennis A. Wilber, Elizabethtown; John P. Schnapp, Columbus, both of Ind.

[73] Assignee: Cummins Engine Company, Columbus, Ind.

[21] Appl. No.: 973,739

[22] Filed: Dec. 28, 1978

[51] Int. Cl.³ ............................................. F02B 37/00
[52] U.S. Cl. .................................... 60/602; 123/323; 138/42; 415/150; 415/151
[58] Field of Search ................ 60/602, 600, 603, 601; 251/207, 209; 137/876; 138/42, 45, 46; 415/148, 151, 157, 150; 123/97 B

[56] References Cited

U.S. PATENT DOCUMENTS

| 2,560,210 | 7/1951 | Browne | 60/602 |
|---|---|---|---|
| 2,621,012 | 12/1952 | Graham | 251/207 |
| 2,629,541 | 2/1953 | Couture | 60/602 |
| 2,638,117 | 5/1953 | Horn | 137/876 |
| 2,710,522 | 6/1955 | Jorgensen et al. | 60/601 |
| 3,019,778 | 2/1962 | Kloss | 123/97 B |
| 3,557,549 | 1/1971 | Webster | 60/602 |
| 3,576,102 | 5/1971 | West | 60/602 |
| 3,931,712 | 1/1976 | Keller | 60/600 |
| 4,005,579 | 2/1977 | Lloyd | 60/602 |
| 4,010,930 | 3/1977 | Sands | 251/209 |
| 4,138,849 | 2/1979 | Wilber | 60/602 |
| 4,171,936 | 10/1979 | Hageman | 60/602 |

Primary Examiner—Michael Koczo
Assistant Examiner—Rae Cronmiller

Attorney, Agent, or Firm—Neuman, Williams, Anderson & Olson

[57] ABSTRACT

An exhaust brake modulating control system is provided for an internal combustion engine having a turbocharger and source of pressurized fluid. The system includes a double-acting piston-cylinder assembly having one cylinder end communicating with the engine exhaust manifold and an opposite end separated from the one end by a piston head. An adjustable control valve is provided having an outlet connected to the cylinder second end, and a plurality of inlets selectively connected to the outlet. One inlet communicates with the pressurized fluid source and a second inlet is vented to the atmosphere. Communicating with the exhaust manifold is an inlet of a hollow section in which a rotor is rotatably mounted. The hollow section has an outlet separated from the inlet by the rotor. The outlet communicates with the turbine wheel chamber of the turbocharger. When the rotor assumes a first selected position, substantially unrestricted exhaust gas flow past the rotor occurs. When the rotor assumes a second selected position, gas flow is substantially blocked by the rotor. The rotor and piston head are operatively connected whereby the rotor is responsive to relative movement of the piston head within the cylinder. When the control valve connects the cylinder second end to the pressurized fluid source, the fluid pressure will balance a predetermined gas pressure on the piston head whereby the head will cause the rotor to assume a position that generates a predetermined exhaust braking effect.

9 Claims, 6 Drawing Figures

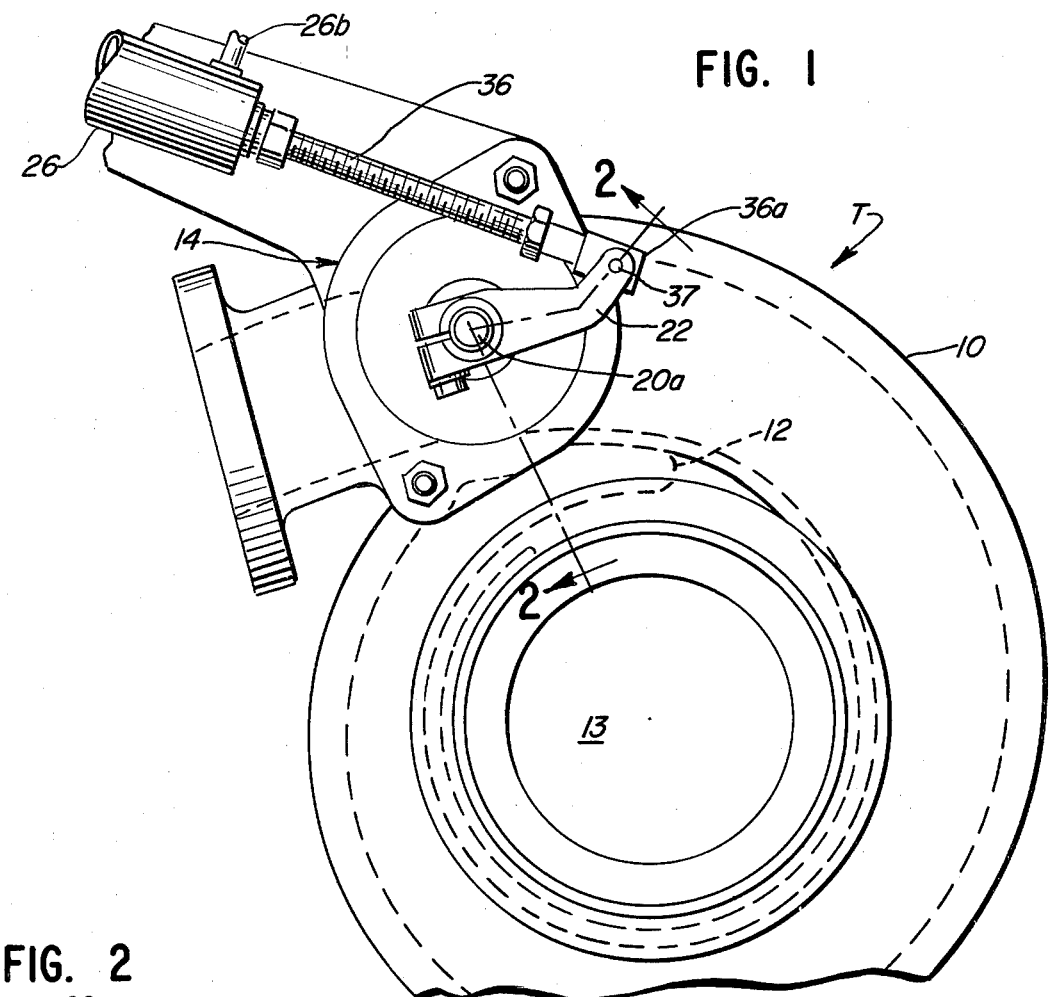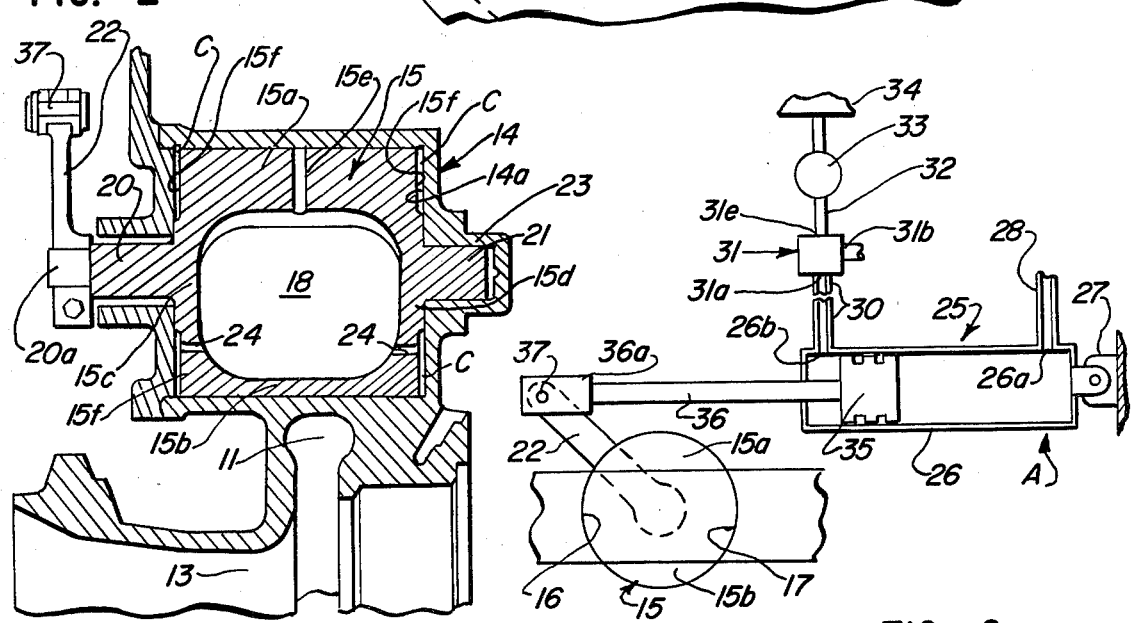

EXHAUST BRAKE MODULATING CONTROL SYSTEM

BACKGROUND OF THE INVENTION

Exhaust braking of internal combustion engines (e.g., diesel) utilized in vehicles has had wide acceptance as an effective means of supplementing the braking produced by pneumatically or hydraulically actuated wheel brakes provided on such vehicles. Various exhaust braking systems for such purposes have heretofore been provided; however, because of inherent design characteristics they have been beset with one or more of the following shortcomings: (a) the system was ineffective in producing the desired braking control; (b) the system was of complex construction and required an inordinate amount of servicing and maintenance; (c) the system was incapable of being modulated to compensate for widely varying operation conditions of the engine; (d) the system deleteriously affected efficient and economic operation of the engine; and (e) the various components comprising the systems were costly, bulky and awkward to install.

SUMMARY OF THE INVENTION

Thus, it is an object of the invention to provide a modulated exhaust braking control system which readily avoids all of the aforenoted shortcomings:

It is a further object of the invention to provide a modulated exhaust braking control system wherein a preset exhaust pressure is maintained throughout the effective braking speed range of the engine.

It is a still further object of the invention to provide a modulated exhaust braking control system which may be readily installed on either existing or new engines.

It is a still further object of the invention to provide a modulated exhaust braking control system for an engine which utilizes a rotor control balanced against thrust and sidewise forces exerted thereon by exhaust gas flow during operation of the engine.

Further and additional objects will appear from the description, accompanying drawings and appended claims.

In accordance with one embodiment of the invention, a modulated exhaust braking control system is provided for use on an internal combustion engine having an exhaust manifold, a turbocharger and a source of pressurized fluid. The turbocharger includes a housing having a turbine wheel chamber. The control system comprises a double acting piston-cylinder assembly having one end of the cylinder connected to receive the exhaust pressure feedback from the exhaust manifold and the opposite, or second, end of the cylinder being separated from the one end by a piston head. The cylinder second end is connected to an outlet forming a part of an adjustable control valve. The control valve is a multiposition valve having a plurality of separate inlets; one inlet being interconnected to the outlet for a given position of said valve. One of the valve inlets is in communication with the source of pressurized fluid. A second inlet of the valve is vented to the atmosphere. Upstream of the valve one inlet is a pressure regulator which is adjusted so that the fluid pressure at the valve one inlet balances a predetermined exhaust gas pressure exerted on the piston head through the cylinder one end.

The system is also provided with a hollow section in which a rotor is adjustably mounted. The rotor separates an inlet and an outlet formed in the hollow section. The hollow section inlet communicates with the exhaust manifold and the hollow section outlet communicates with the turbine wheel chamber. When the rotor is disposed in a first selected position of adjustment, substantially unrestricted exhaust gas flow occurs through the rotor. When the rotor is disposed in a second selected position of adjustment the exhaust gas flow is substantially blocked by the rotor. The rotor is operatively connected to the piston head and is responsive to the movement of the latter within the cylinder. The rotor is biased to normally assume a predetermined position of adjustment.

DESCRIPTION

For a more complete understanding of the invention reference should be made to the drawings wherein:

FIG. 1 is a fragmentary side elevational view of a turbocharger equipped with one form of the exhaust brake modulating control system.

FIG. 2 is a fragmentary sectional view taken along line 2—2 of FIG. 1.

FIG. 6 is a diagrammatic view on a reduced scale of the exhaust brake modulating control system substantially as shown in FIG. 1.

Figure 3:
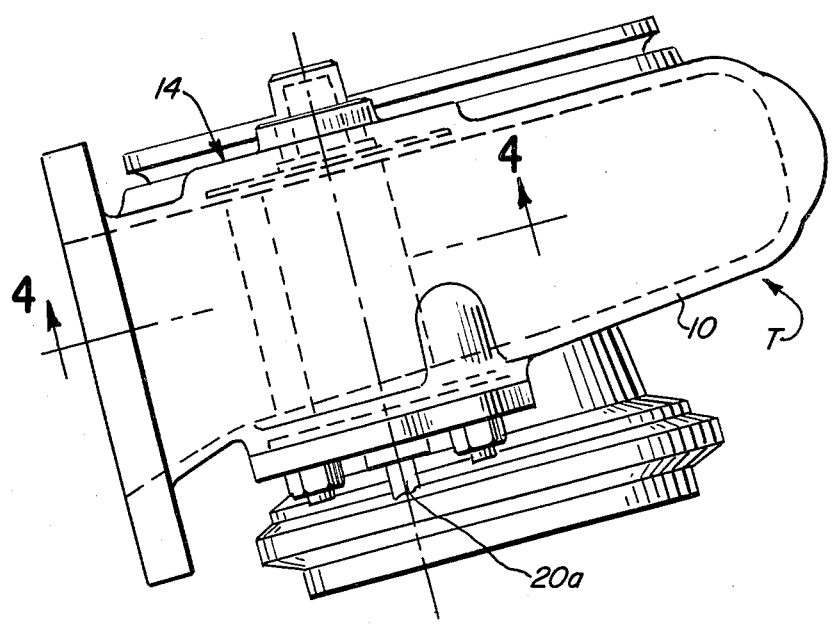
FIG. 3 is a fragmentary top plan view of the turbocharger of FIG. 1.

Referring now to the drawings and more particularly to FIG. 1, a turbocharger T is shown which is adapted to be installed on an internal combustion engine (e.g., a diesel type) not shown. The engine may be of the conventional design utilized on vehicles such as semitrailer trucks and the like. In the illustrated embodiment the turbocharger T has a voluted housing or casing 10 provided with a chamber 11 in which a turbine wheel, not shown, is rotatably mounted. The chamber 11 has formed therein an exhaust gas entry 12 and an exhaust gas exit 13.

Disposed upstream of the entry 12 and forming a part of casing 10 is a hollow section 14 in which is housed a rotor 15. The section 14 is provided with an inlet 16 which communicates with the engine exhaust manifold, not shown. Substantially diametrically opposite inlet 16 is an outlet 17 which, in turn, communicates with the exhaust gas entry 12. The inlet and outlet are separated by rotor 15. The rotor coacts with the inlet and outlet to form the exhaust brake for the engine.

Figure 4:
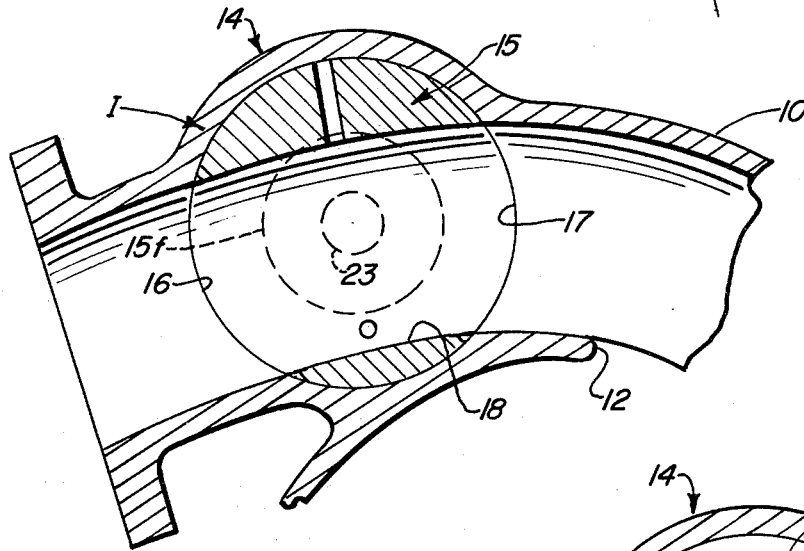
FIG. 4 is a fragmentary sectional view taken along line 4—4 of FIG. 3 and showing the rotor in the first selected position of adjustment.

Rotor 15 is provided with a large passageway 18 which is of such size and shape that, when the rotor is in a first selected position of adjustment I, see FIG. 4, it will permit substantially unrestricted exhaust gas flow from the exhaust manifold to the turbine wheel chamber 11. When, however, the rotor 15 assumes a second selected position of adjustment II, see FIG. 5, the rotor substantially blocks gas flow through the hollow section 14. The passageway 18 of the rotor is defined by a pair of opposed chordlike segments 15a, 15b and a pair of opposed wall segments 15c, 15d, see FIG. 2. Chordlike segment 15a is of greater dimension than segment 15b and is provided with a bleeder port 15e, the function of which will become apparent from the discussion hereinafter. The outer curved periphery of the segments 15a, 15b are in sliding sealing contact with the interior wall surface of the hollow section 14 when the rotor is in selected position I, see FIG. 4. When, however, the rotor is in position II, see FIG. 5, peripheral portions of the curved periphery of segment 15a remain in sliding sealing contact with portions of the hollow section interior wall surface which are disposed circumjacent the inlet 16, thus, blocking gas flow through inlet 16 except for that which flows through bleeder port 15e. The size of chordlike segment 15b, on the other hand, is such that it will not block off outlet 17 and therefore the amount of exhaust gas which is bled through port 15e will flow past segment 15b and into the turbine wheel chamber and thereby maintain rotation of the turbine wheel at idling speed. The rotation of the turbine wheel at idling speed is desirable in order to maintain proper sealing at the wheel bearings. By having at least one of the segments 15a, 15b in sliding sealing contact with the interior wall surface of hollow section 14, the stability of the rotor within the hollow section is significantly enhanced.

Figure 5:
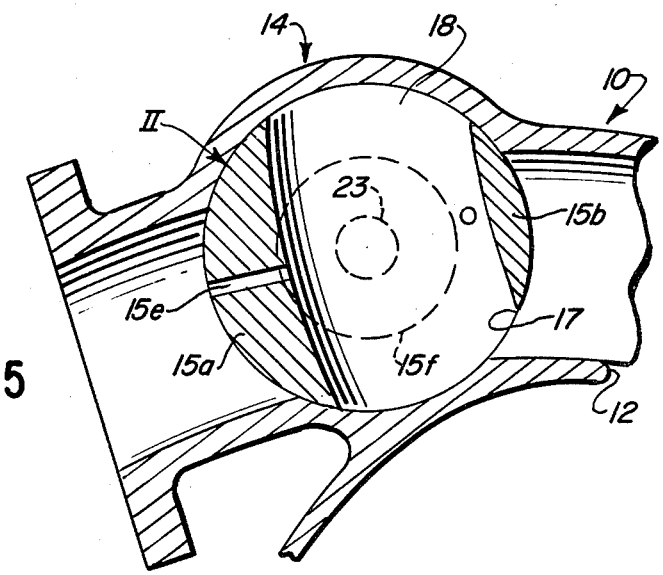
FIG. 5 is similar to FIG. 4 but showing the rotor in the second selected position of adjustment.

While segment 15a is shown in blocking relation with the inlet 16 in FIG. 5, when the rotor is in position II, the same effect will be obtained if segment 15a was in blocking relation with outlet 17. Thus, the direction (clockwise or counterclockwise) of rotation of the rotor when moving from position I to position II will depend on the relative location of a rotor-actuating assembly A with respect to the hollow section 14. In the rotor shown in FIG. 1, the direction of rotation thereof is counterclockwise and in FIG. 6 the direction of rotation thereof is clockwise.

As will be observed in FIG. 2, the wall segments 15c and 15d of the rotor 15 have axially aligned, outwardly extending axle sections 20, 21, respectively. Section 20 has an exposed stub 20a protruding outwardly from the hollow section 14 and is fixedly connected to one end of a lever 22. The opposite axle section 21 is supported by a journal bearing 23 formed within the hollow section 14.

In order to counterbalance any sidewise thrust which the rotor might experience during operation of the turbocharger, an annular cavity C is formed at each side of the rotor between the end face 15f of the rotor and the adjacent side wall surface 14a of the hollow section 14, see FIG. 2. The cavities C in the illustrated embodiment encompass the axle sections 20, 21 and are spaced radially therefrom. Each cavity C communicates with the passageway 18 through ports 24 formed in the wall segments 15c, 15d of the rotor. Thus, while exhaust gas is flowing through the hollow section 14, a small amount of the gas will become entrapped within the cavities and serve to maintain the rotor in axially balanced relation within the housing section. The end faces of the rotor are preferably provided with annular recesses; however, in some instances the recesses might be formed in the adjacent wall surfaces of the hollow section.

Adjustment of the rotor 15 is controlled by the modulating system shown more clearly in FIG. 6. The system embodies the rotor-actuating assembly A which includes a double acting piston-cylinder unit 25 having a cylinder 26 which is pivotally mounted externally of the turbocharger casing 10 to a bracket 27 fixedly carried by a convenient part of the engine or turbocharger.

Adjacent the pivotally mounted end of cylinder 26 is a port 26a through which exhaust gas pressure is fed by means of a tube section 28 which terminates at the exhaust manifold. Adjacent the opposite end of cylinder 26 is a second port 26b which is connected by a tube section 30 to a port 31a of a multiposition control valve 31. The adjustment of valve 31 may be remotely controlled by the driver from the cab of the vehicle in which the system and turbocharger are installed. Besides the port 31a connected to tube section 30, valve 31 is provided with a port 31b which is vented to the atmosphere, and a third port 31c which is connected by a tube section 32 to a variable pressure regulator 33. The regulator communicates with a source of pressurized fluid 34 which is customarily available on trucks for actuating wheel brakes.

Slidably mounted within cylinder 26 is a piston head 35 which separates ports 26a, 26b from one another. Carried by and extending axially in one direction from the piston head is an elongated rod 36. The rod extends through a suitable opening formed at the end of the cylinder opposite the pivotally mounted end. The free end 36a of rod 36 is pivotally connected by pin 37 to the free end of lever 22; the latter being connected to the stub 20a of rotor 15. Thus, rotor 15 is responsive to the movement of the piston head 35 within the cylinder 26. As aforementioned, the rotor 15 is biased to normally assume a predetermined position (e.g., position I wherein there is substantially unrestricted gas flow through the hollow section from the exhaust manifold to the turbine wheel chamber of the turbocharger T). In some instances the biasing may be accomplished by a coil spring, not shown, acting upon the rod end 36a. In the system illustrated in FIG. 6; however, whenever the engine is running there will be an exhaust feedback pressure existing at port 26a and depending upon the adjustment of control valve 31 (e.g., where ports 31a and 31b are interconnected) the piston head 35 will be moved to the left.

To facilitate starting the engine, it is desirable that the control valve 31 be adjusted so that ports 31a, 31b are interconnected.

Regulator 33 is preset so that the pressure at port 31c, when ports 31a, 31c are interconnected, will balance a predetermined exhaust feedback pressure at the cylinder port 26a and, thus, maintain the piston head 35 and, accordingly, rotor 35 in predetermined relative positions so as to generate a predetermined exhaust braking effect. Once these relative positions have been attained, the preset fluid pressure at port 26b will compensate for pressure variations at port 26a and, thus, cause the engine output to remain substantially constant. Once the engine is receiving fuel to produce a power output, the driver will normally adjust the valve 31 to the position where ports 31c, 31a are interconnected.

In most instances presetting of the regulator 33 is accomplished by the driver from the cab of the truck. Adjustment of both the regulator 33 and valve 31 will oftentimes depend upon the geographical and road conditions which the driver anticipates will be encountered.

Thus, it will be seen that a simple well-balanced rotor in combination with a simple modulating control system has been provided which is highly effective in attaining a desired exhaust braking and, in turn, resulting in the safe and efficient operation of a turbocharged internal combustion engine. The components of the system may vary from that shown and in any case are easily installed on new or existing engines.

We claim:
1. A rotary exhaust brake modulating control system for use on an internal combustion engine having an exhaust manifold, a turbocharger with a housing having a chamber in which a turbine wheel is rotatably mounted, and a source of pressurized fluid; said system comprising a double-acting piston-cylinder assembly having one end of a cylinder adapted to communicate with the exhaust manifold and a second end of the cylinder separated from the said one end by a piston head; an adjustable control valve having an outlet communicating with the cylinder second end and a plurality of inlets selectively connected to the outlet, one of said inlets being adapted to be in communication with the source of pressurized fluid and a second inlet being vented to the atmosphere; a hollow section having an inlet adapted to be connected to the exhaust manifold and an outlet adapted to be connected to the turbine wheel chamber; a rotor mounted within said hollow section for rotation between a first selected position wherein substantially unrestricted gas flow occurs between said housing section inlet and outlet and a second selected position wherein gas flow between said inlet and outlet is substantially blocked by said rotor; means operatively connected to said piston head and said rotor wherein rotational movement of said rotor is responsive to the relative movement of said piston head within said cylinder; and pressure regulating means disposed intermediate the source of pressurized fluid and the control valve one inlet and being preset whereby the pressure of the pressurized fluid entering the control valve one inlet balances a predetermined exhaust manifold pressure exerted on one side of said piston head causing the latter to assume a relative position within said cylinder and the rotor to assume a position generating a predetermined exhaust braking effect.

2. The system of claim 1 wherein the pressure regulating means is provided with manually adjustable means for varying the presetting of the pressure of the pressurized fluid entering the control valve one inlet.

3. The system of claim 1 wherein the piston head normally assumes a relative position whereby the rotor is disposed in said first selected position.

4. The system of claim 3 wherein the rotor is provided with a passage extending substantially transversely of the axis of rotation of said rotor and interconnecting the housing section inlet and outlet when said rotor is in said first selected position.

5. The system of claim 1 wherein the control valve is manually adjustable to effect interconnection between the outlet thereof and a selected inlet.

6. The system of claim 4 wherein the rotor is provided with axially spaced end face portions disposed on opposite sides of the passage and adjacent to hollow section wall surface portions, corresponding end face and wall surface portions coacting to form a cavity in encircling relation with respect to the axis of rotation of said rotor; each end face portion being provided with a port interconnecting said passage and a cavity.

7. The system of claim 6 wherein the end face portions of said rotor are provided with axially aligned outwardly projecting elements journaled in adjacent wall surface portions of said hollow section; the cavities formed between said rotor end face portions and said wall surface portions being radially spaced outwardly and in encircling relation with respect to said projecting elements.

8. The system of claim 7 wherein each cavity includes an annular recess formed in each end face portion of said rotor.

9. The system of claim 7 wherein each cavity is of substantially like configuration and is disposed in spaced substantially concentric relation with respect to said projecting elements whereby said rotor is axially balanced during gas flow through the rotor passage.

* * * * *